United States Patent
Jaggi et al.

(10) Patent No.: US 10,599,534 B1
(45) Date of Patent: Mar. 24, 2020

(54) THREE LANE BIT-FOR-BIT REMOTE ELECTRONIC UNIT

(71) Applicant: BAE Systems Controls Inc., Endicott, NY (US)

(72) Inventors: Gurjeet S. Jaggi, East Windsor, NJ (US); Bryan W. Berical, Vestal, NY (US); James F. Buchanan, Johnson City, NY (US); Bryan L. Early, Vestal, NY (US); Gary P. Ellsworth, Endicott, NY (US); Dino A. Gianisis, Binghamton, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 16/181,632

(22) Filed: Nov. 6, 2018

(51) Int. Cl.
*G06F 11/18* (2006.01)
*G06F 13/16* (2006.01)

(52) U.S. Cl.
CPC .......... *G06F 11/187* (2013.01); *G06F 11/182* (2013.01); *G06F 13/1663* (2013.01)

(58) Field of Classification Search
CPC ... G06F 11/187; G06F 11/182; G06F 13/1663
See application file for complete search history.

(56) References Cited

U.S. PATENT DOCUMENTS

| | | |
|---|---|---|
| 4,130,241 A | 12/1978 | Meredith et al. |
| 4,849,893 A * | 7/1989 | Page ................ G05D 1/0077 701/3 |
| 5,493,497 A | 2/1996 | Buus |
| 5,550,731 A | 8/1996 | Jackson |
| 2007/0033195 A1* | 2/2007 | Stange .................. G05B 9/03 |
| 2009/0031198 A1 | 1/2009 | Johansson |
| 2011/0066305 A1* | 3/2011 | Lin ..................... G05D 1/0077 701/3 |

(Continued)

OTHER PUBLICATIONS

Aruna, S., "Automated testing of multiple redundant electrohydraulic servo-actuators and their test sets," 24th Digital Avionics Systems Conference, Date of Conference: Oct. 30-Nov. 3, 2005, Conference Location: Washington, DC, USA, IEEE, pp. 6.B.3-1 to 6.B.3-8. (Year: 2005).*

(Continued)

*Primary Examiner* — Kyle Vallecillo
(74) *Attorney, Agent, or Firm* — Scully Scott Murphy & Presser PC (57) ABSTRACT

Remote electronic units effective to generate output data for an actuator are described. A remote electronic unit may include first, second, and third lanes. The first, second, and third lanes may receive input data including an actuator command. The first, second, and third lanes may generate first, second, and third output data, respectively, based on the input data. The first, second, and third lanes may respectively send the first, second, and third output data to a voter. The first and second lanes may respectively send the first and second output data to a multiplexer. The voter may output a selection signal to the multiplexer if at least two out of the first, second, and third output data are identical. The multiplexer may select one of the first and the second output data based on the selection signal and transmit the selection to the actuator via an actuator control electronics.

20 Claims, 6 Drawing Sheets

(56) References Cited

U.S. PATENT DOCUMENTS

| 2012/0290153 | A1* | 11/2012 | Olsoe | B64C 13/505 |
| | | | | 701/3 |
| 2013/0311006 | A1 | 11/2013 | Ahmad et al. | |
| 2019/0227538 | A1* | 7/2019 | Lassini | B64C 39/024 |
| 2019/0227548 | A1* | 7/2019 | Lassini | G05D 1/0011 |
| 2019/0227826 | A1* | 7/2019 | Taylor | G05D 1/0011 |
| 2019/0230793 | A1* | 7/2019 | Lassini | B64C 39/024 |

OTHER PUBLICATIONS

Yeh, Y.C., "Triple-Triple Redundant 777 Primary Flight Computer", Proceedings of 1996 IEEE Aerospace Applications Conference, Feb. 1998, pp. 293-307.

International Search Report, PCT/US19/60011, dated Jan. 27, 2020, 8 pages.

* cited by examiner

THREE LANE BIT-FOR-BIT REMOTE ELECTRONIC UNIT

FIELD

The present application relates generally to systems and architectures associated with remote electronic units.

BACKGROUND

In a fly-by-wire (FBW) system of an aircraft, actuators of the aircraft may be controlled through remote electronic units (REUs). The REUs may convert control inputs for the actuators into electronic signals that may be used to control the actuators. The REUs may facilitate control of the actuators of a flight control surface of the aircraft, such as wing surface actuators including ailerons, flaperons, high lift, and wingtip fold, or tail surfaces such as elevators, rudder, and stabilizer. The REUs are configured to communicate with other electronic boxes, such as Actuator Control Electronics (ACE) or Flight Control Computers (FCC). Thus, the integrity of the electronic signals generated by the REUs and the digital/serial interface between the REUs and the other electronic devices must be high in order to guarantee safety of the aircraft.

SUMMARY

In some examples, a remote electronic unit is generally described. The remote electronic unit may include a first lane, a second lane, and a third lane, configured to be in communication with each other. The first lane may be configured to receive input data associated with a command to control an actuator. The first lane may be further configured to generate first output data based on the input data. The first lane may be further configured to send the first output data to the voter. The first lane may be further configured to send the first output data to the multiplexer. The second lane may be configured to receive the input data. The second lane may be further configured to generate second output data based on the input data. The second lane may be further configured to send the second output data to the voter. The second lane may be further configured to send the second output data to the multiplexer. The third lane may be configured to receive the input data. The third lane may be further configured to generate third output data based on the input data. The third lane may be further configured to send the third output data to the voter. The voter may be configured to output a selection signal to the multiplexer in response to at least two out of the first, second, and third output data being identical. The multiplexer may be configured to select one of the first output data and the second output data based on the selection signal. The multiplexer may be further configured to transmit the selected output data to an actuator control electronics unit that is configured to convert the selected output data into an analog servo command for the actuator.

In some examples, a method for generating output data to control an actuator is generally described. The method may include receiving, at a first lane, a second lane, and a third lane of the remote electronic unit, input data associated with a command to control an actuator. The method may further include generating, by the first lane, first output data based on the input data. The method may further include sending, by the first lane, the first output data to a voter. The method may further include sending, by the first lane, the first output data to a multiplexer. The method may further include generating, by the second lane, second output data based on the input data. The method may further include sending, by the second lane, the second output data to the voter. The method may further include sending, by the second lane, the second output data to the multiplexer. The method may further include generating, by the third lane, third output data based on the input data. The method may further include sending, by the third lane, the third output data to the voter. The method may further include outputting, by the voter, a selection signal to the multiplexer in response to at least two out of the first, second, and third output data being identical. The method may further include selecting, by the multiplexer, one of the first output data and the second output data based on the selection signal. The method may further include transmitting, by a transmitter of the remote electronic unit, the selected output data to an actuator control electronics unit that is configured to convert the selected output data into an analog servo command for the actuator.

In some examples, a system effective to generate an output to control an actuator are generally described. The system may include an actuator and a control mechanism configured to generate input data associated with a command to control the actuator. The system may further include an actuator control electronics unit that is configured to convert the command into an analog servo command for the actuator. The system may further include a remote electronic unit configured to be in communication with the control mechanism and the actuator. The remote electronic unit may include a first lane, a second lane, and a third lane configured to be in communication with each other. The system may further include a voter configured to be in communication with the first lane, the second lane, and the third lane. The system may further include a multiplexer configured to be in communication with the first lane and the second lane. The first lane may be configured to receive the input data. The first lane may be further configured to generate first output data based on the input data. The first lane may be further configured to send the first output data to the voter. The first lane may be further configured to send the first output data to the multiplexer. The second lane may be configured to receive the input data. The second lane may be further configured to generate second output data based on the input data. The second lane may be further configured to send the second output data to the voter. The second lane may be further configured to send the second output data to the multiplexer. The third lane may be configured to receive the input data. The third lane may be further configured to generate third output data based on the input data. The third lane may be further configured to send the third output data to the voter. The voter may be configured to output a selection signal to the multiplexer in response to at least two out of the first, second, and third output data being identical. The multiplexer may be configured to select one of the first output data and the second output data based on the selection signal. The multiplexer may be further configured to transmit the selected output data to the actuator control electronics unit. The actuator control electronics unit may be configured to convert the selected output data into the analog servo command for the actuator.

Further features as well as the structure and operation of various embodiments are described in detail below with reference to the accompanying drawings. In the drawings, like reference numbers indicate identical or functionally similar elements.

DETAILED DESCRIPTION

In a flight control system, output control data for line replacement units (LRUs) are generated by a command (COM) lane. The integrity of the output control data generated by the command lane is typically required to be less than 1E-7 (or $10^{-7}$) failures per hour (FPH). The integrity of the output control data generated by the command lane is generally verified to ensure that the output control data is not erroneous due to internal error(s), and in order to meet the integrity requirement. A monitor (MON) lane is used to monitor the outputs of the command lane to ensure the integrity of the command lane. The monitor lane may include dissimilar hardware from the command lane to mitigate generic errors between the command lane and the monitor lane. The monitor lane may independently determine the same outputs as the command lane, which are then compared with wrapped data from the command lane outputs.

The architecture of command/monitor (COM/MON) lanes may be used in remote electronic units (REUs) to control an actuator. Typically two or more redundant REUs are used in an active/active, or an active/standby, configuration to ensure continued operation if one of the REUs experiences a failure. However, such architecture may be subject to loss of actuator control if a generic fault occurs in either the command lane or the monitor lane processing element. The generic fault problem may be solved by introducing a second COM/MON REU that features dissimilar processing elements from the original COM/MON REU. However, introduction of the second REU typically requires two unique REU designs and four dissimilar processing elements to distribute between the two unique REU designs. Cost and technology challenges make this an undesirable option.

Figure 1:
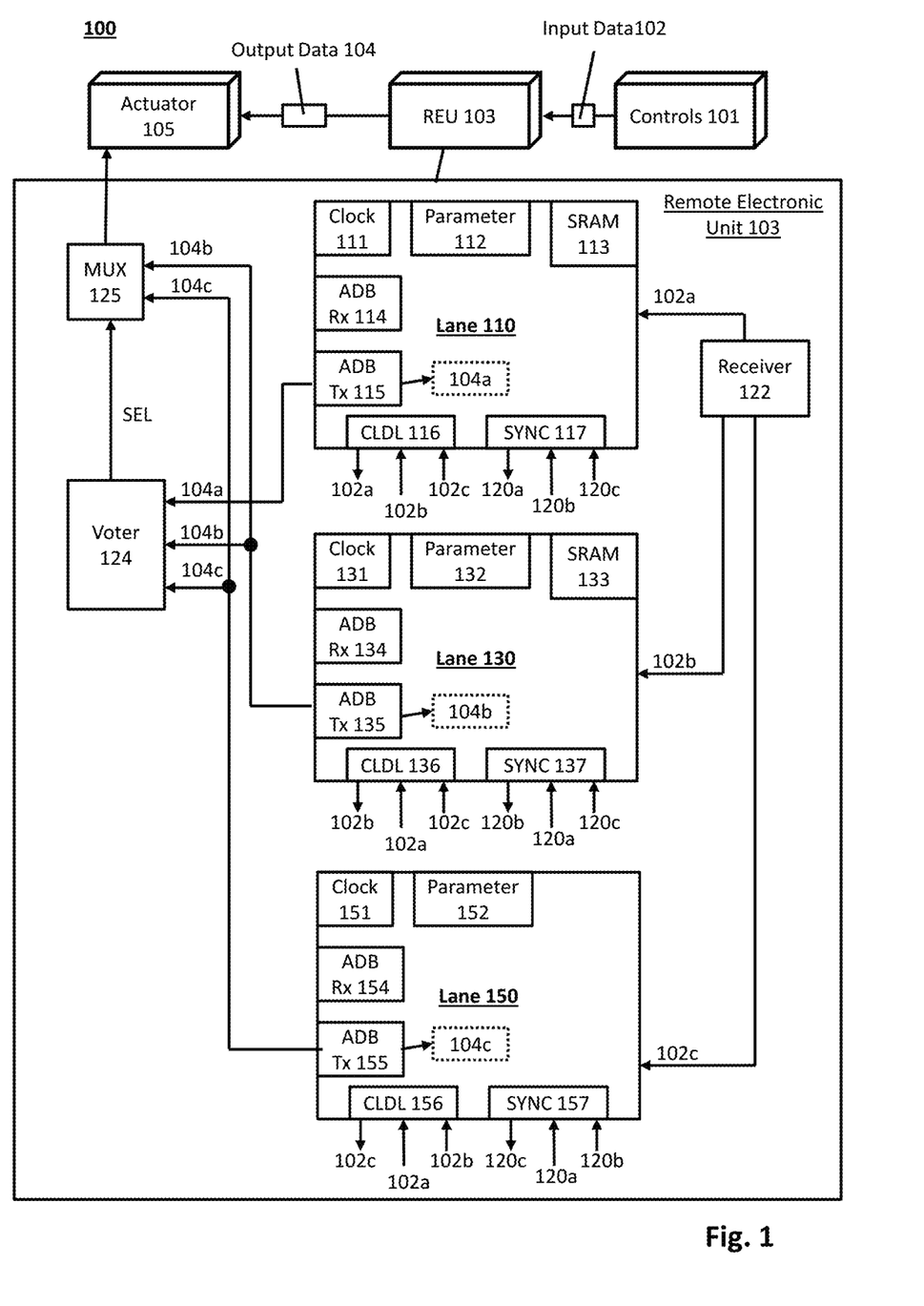
FIG. 1 illustrates an example system in one embodiment that can be utilized to implement a three lane bit-for-bit remote electronic unit.

In one embodiment, an architecture of a remote electronic unit (REU) 103, shown in FIG. 1, in accordance with the present disclosure, may provide a solution to mitigate the shortcomings of the COM/MON architecture described above. The architecture of the REU 103 may be implemented with three dissimilar processing lanes. By using three dissimilar processing lanes, two or more REUs may control an actuator without concern that a single generic fault in one of the processing lanes will disable all REUs and result in loss of actuator control.

In some examples, the REUs may be required to have relatively high-integrity output, such as an integrity requirement for no erroneous output data with failure probability being less than 1E-10 (or $10^{-10}$) FPH. Such a requirement may be fulfilled by matching the REU outputs from the three lanes using a bit-for-bit matching approach (e.g., matching the outputs from the three lanes at the bit level). By requiring the three lane outputs to match bit-for-bit, the system 100 may eliminate the need to do any oscillatory analysis on the output data since all three lanes are producing the same data. In another example to eliminate the need to do any oscillatory analysis on the output data, a threshold and persistence approach may be implemented with the bit-for-bit tracking. The threshold and persistence approach, while implemented with the bit-for-bit tracking, requires an analysis to ensure the threshold and persistence chosen are able to meet an aircraft level structural oscillatory/transient requirements, thus eliminating the need to do any oscillatory analysis on the output data from the bit-for-bit tracking.

Achieving bit-for-bit identical outputs from the three lanes may require all three REU lanes to process identical input data. Given that three processing lanes in this example are driven by three independent clock devices and each clock device has associated independent hardware tolerance, the three lanes may be running asynchronous to each other. All three lanes implement time dependent functions within the control laws, such as integrators and derivatives, which eventually will start to diverge and can cause lanes to produce outputs that are not bit-for-bit identical. Therefore, it is essential to devise a mechanism such that all three lanes use the same set of input data and all three lanes execute their internal processing tasks at the same time. As will be described in more detail below, lane synchronization, combined with input data coherency, ensures that all three processing lanes will generate bit-for-bit identical outputs.

In an example, one of the three processing lanes may transmit actuator data bus (ADB) data to the actuator control electronics (ACE) of the aircraft, where the ACEs may be electronics that generate actuator commands, send the actuator commands to the REU 103, where the REU 103 may convert the received actuator commands into analog servo commands, and return the analog servo commands back to the ACE. In some examples, the REU 103 may further include other interfaces such as pressure sensors and other displacement transducers (VDT) to facilitate receipt of the actuator commands and transmission of the analog servo commands back to ACE. All three lanes may monitor the ADB data being transmitted via wraparound, bit-for-bit, as it is being transmitted. If two of the three lanes detect that faulty data is being transmitted (e.g., transmitted data fails bit-for-bit comparison with its own local data), then the lanes detecting the fault may immediately disable the ADB transmitter, thus truncating the ADB data packet. The ACE may detect the truncated ADB transmission as a failure and continue using a previous set of data received from the REU. This ADB fault detection/protection mechanism may ensure that the "less than 1E-10 (or $10^{-10}$) FPH" integrity requirement of not transmitting erroneous data to the ACE (e.g., data that may be perceived by the ACE as valid data) is met by the REU.

In an example, each primary surface (e.g., aileron, rudder, elevators and flaperon) of the aircraft have active/active configuration, meaning two actuators and two REUs to control the surface. As used herein, aircraft refers to any air-borne item such as fixed wing aircraft, rotary wing aircraft, unmanned aerial vehicles, and precision guided munitions.

FIG. 1 illustrates an example system 100 that can be utilized to implement a three lane bit-for-bit remote electronic unit, arranged in accordance with at least some embodiments described herein. In some examples, the system 100 may be a part of a flight control system. The system 100 may include at least a set of controls 101, one or more remote electronic units (REUs) 103, and/or one or more actuators 105. In some examples, the REU 103 may be an electronic component that may be in proximity to, or may be mounted on, the actuator 105 in order to provide local control of the actuator 105. The REU 103 may receive commands and may process incoming and outgoing signals for the functions necessary to control the actuator 105. The set of controls 101 may be a set of flight controls including mechanisms that may be moved, such as by a pilot of an aircraft, to generate input data 102. For example, the pilot may move a control stick in a cockpit, or may apply pressure on rudder pedals, to generate input controls. In other examples, automated or semi-automated computer controlled processing can generate the input data. The input controls may be represented as input data 102 and may be converted by the REU 103 into a set of output data 104, where output data 104 may include electronic signals that may be used to control the actuator 105. In some examples, input data 102 and/or output data 104 may include analog signals.

As shown in FIG. 1, the REU 103 may include three lanes—lane 110, lane 130, and lane 150. In some examples, each lane may include a respective set of components, and each lane may be programmed to execute a respective set of operations. In an example, each lane may be a field-programmable gate array (FPGA) device such that each lane may include individual sets of logic blocks programmed, or configured, with hardware description language. Each lane may be driven by a respective oscillator, such that each lane may operate asynchronously and under individual clock cycles. Even though each lane may be driven by a respective oscillator, the three oscillators may be of a same model but programmed to drive the three lanes at respective clock speeds. The REU 103 may further include a receiver 122 and a transmitter 124, where the receiver 122 and the transmitter 124 are configured to be in communication with lanes 110, 130, 150. It should be understood that the reference to first, second and third lanes is for illustrative and explanatory purposes and not in relation to a specific unit, lane or process flow.

In the example shown in FIG. 1, the lane 110 may include one or more logic blocks such as a clock 111, a parameter block 112, a static random access memory (SRAM) block 113, an actuator data bus reception block (ADB Rx) 114, an actuator data bus transmission block (ADB Tx) 115, a cross lane data link (CLDL) block 116, and a synchronization (SYNC) block 117. The clock 111 may be driven by a first oscillator (not shown), and outputs of the clock 111 may regulate a flow of signals among logic blocks of the lane 110, and also a flow of signals received at, or transmitted from, the lane 110. The parameter block 112 may be a block configured to store a set of parameters to facilitate operations of the lane 110. In some examples, the parameters stored in the parameter block 112 may be received from a non-volatile memory of the REU 103. The SRAM block 113 may include data read from an electrically erasable programmable read-only memory (EEPROM). The ADB Rx reception block 114 may be configured to facilitate receipt of data from the actuator 105 through an ADB connected to lanes 110, 130, 150. The CLDL block 116 may be configured to facilitate exchange of copies of input data 102, which will be further described below. The SYNC block 117 may be configured to facilitate synchronization among lanes 110, 130, 150, which will be further described below.

In some examples, the ADB Tx transmission block 115 may be a part of the lane 110, but may not be programmed to transmit an output from the lane 110. In some examples, programming discretes may be uniquely defined for each REU location on an aircraft may determine whether the lane 130 or the lane 150 is a transmitter of output data 104. By programming two of the three lanes to transmit output data 104, a generic fault mitigation may be provided by the REU 103. Further, configuration of having two of the three lanes to transmit the output allows the REU 103 to dispatch with one failed lane among the three lanes, but will not dispatch with two failed lanes. Furthermore, configuration of having two of the three lanes to transmit the output may minimize hardware and firmware usage in the design of the REU 103.

The lane 130 may include one or more logic blocks such as a clock 131, a parameter block 132, a static random access memory (SRAM) block 133, an actuator data bus reception block (ADB Rx) 134, an actuator data bus transmission block (ADB Tx) 135, a cross lane data link (CLDL) block 136, and a synchronization (SYNC) block 137. The clock 131 may be driven by a first oscillator (not shown), and outputs of the clock 131 may regulate a flow of signals among logic blocks of the lane 130, and also a flow of signals received at, or transmitted from, the lane 130. The parameter block 132 may be a block configured to store a set of parameters to facilitate operations of the lane 130. In some examples, the parameters stored in the parameter block 132 may be received from a non-volatile memory of the REU 103. The SRAM block 133 may include data read from an electrically erasable programmable read-only memory (EEPROM). The ADB reception block 134 and the ADB transmission block 135 may be configured to facilitate receipt and transmission of data from and to the actuator 105 through a ADB connected to lanes 110, 130, 150. The CLDL block 136 may be configured to facilitate exchange of copies of input data 102, which will be further described below. The SYNC block 137 may be configured to facilitate synchronization among lanes 110, 130, 150, which will be further described below.

The lane 150 may include one or more logic blocks such as a clock 151, a parameter block 152, an actuator data bus reception block (ADB Rx) 154, an actuator data bus transmission block (ADB Tx) 155, a cross lane data link (CLDL) block 156, and a synchronization (SYNC) block 157. The clock 151 may be driven by a first oscillator (not shown), and outputs of the clock 151 may regulate a flow of signals among logic blocks of the lane 150, and also a flow of signals received at, or transmitted from, the lane 150. The parameter block 152 may be a block configured to store a set of parameters to facilitate operations of the lane 150. In some examples, the parameters stored in the parameter block 152 may be received from a non-volatile memory of the REU 103. The ADB reception block 154 and the ADB transmission block 155 may be configured to facilitate receipt and transmission receipt and transmission of data from and to the actuator 105 through a ADB connected to lanes 110, 130, 150. The CLDL block 156 may be configured to facilitate exchange of copies of input data 102, which will be further described below. The SYNC block 157 may be configured to facilitate synchronization among lanes 110, 130, 150, which will be further described below.

In an example, the lane 150 may exclude a SRAM logic block, which is different from the lane 110 (having SRAM block 113) and the lane 130 (having SRAM block 133), when the lane 150 is being implemented with Flash-based FPGA and the lanes 110, 130 are being implemented with SRAM-based FPGA. As such, the lanes 110 and 130 may program themselves at each power up from a boot memory device.

In an example, a receiver 122 of the REU 103 may receive input data 102 from controls 101. In some examples, the REU 103 may include an analog-to-digital converter (ADC) configured to convert input data 102, which may be analog data, received at receiver 122 into digital data, prior to a distribution of the input data 102 to lanes 110, 130, 150. The receiver 122 may distribute the input data 102 to lanes 110, 130, 150. Since lanes 110, 130, 150 operate on respective clocks 111, 131, 151, lanes 110, 130, 150 may receive copies of the input data 102 from receiver 122 at different times. Further, since lanes 110, 130, 150 may implement time dependent functions within the control laws, the copies of input data 102 received at each lane may become different from each other over time, which may cause lanes 110, 130, 150 to produce different outputs based on the different copies of input data 102.

In order to ensure that lanes 110, 130, 150 are using a same copy of input data 102, each lane may share its respective copy of input data 102 with the other two lanes. Upon the exchange of copies of input data 102, each lane may have access to the same three copies of input data 102. Each lane may then mid-value select the three copies of the input data 102, or select a copy of the input data 102 that is a median among the three copies. By selecting a copy of input data 102 based on the same rule (mid-value select), the three lanes 110, 130, 150 may use identical input data to generate respective output data 104.

For example, the lane 110 may receive a first copy of the input data 102 (labeled as 102*a*), the lane 130 may receive a second copy of the input data 102 (labeled as 102*b*), and the lane 150 may receive a third copy of the input data 102 (labeled as 102*c*), from the receiver 122. The lane 110 may send the first copy of the input data 102*a* to lanes 130, 150 through CLDL block 116. The lane 130 may send the second copy of the input data 102*b* to lanes 110, 150 through CLDL block 136. The lane 150 may send the third copy of the input data 102*c* to lanes 110, 130 through CLDL block 156. The CDLD blocks 116, 136, 156 may also facilitate receipt of copies of input data 102 at each lane. As a result, lanes 110, 130, 150 may each have access to the first, second, and third copies of input data 102 (102*a*, 102*b*, 102*c*). Each of lanes 110, 130, 150 may select a particular copy of the input data 102 that includes a median value among the values of the first, second, and third copies of input data 102*a*, 102*b*, 102*c*. For example, if the second copy of input data 102*b* is selected by lanes 110, 130, 150, then the lanes 110, 130, 150 may generate a first output data 104*a*, a second output data 104*b*, a third output data 104*c*, respectively, using the selected copy of input data 102*b*.

In some examples, cross lane compare monitor (CLCM) may also be performed in each lane among lanes 110, 130, 150 on the values of the copies of input data 102*a*, 120*b*, 102*c*. If one of the three lanes provides a value that is out of tolerance (e.g., by comparing a value of the copy of the input data 102 with a predefined threshold) with respect to the values provided by the other two lanes, then the lane providing the faulty value will be reset by the other two lanes in an attempt to restore proper operation in the third lane.

In an example, the input data 102 may include sensor data generated by various sensors of system 100 (not shown), and the REU 103 may forward the sensor data to the actuators via an actuator data bus (ADB). Data coherency is also needed on the ADB interface and all the input sensor data received by the REU 103. The ADB data may be provided to the three lanes 110, 130, 150 as it is received by the REU 103, and may be received by the lanes 110, 130, 150 asynchronous to the internal processing tasks at each lane. The sensor data may then be transmitted by the REU 103 to the actuator 105 via the ADB. Application of mid-value select (MVS) on the sensor data may ensure that the three lanes 110, 130, 150 may provide bit-for-bit identical values for transmission to the ADB. In some examples, other ADB data, such as control law (CLAW) variables, may be provided by the REU 103 via the ADB. Such ADB data may also be shared over the CLDL blocks of the lanes 110, 130, 150, and MVS may be applied on the ADB data prior to populating the values of the ADB data on the ADB. Thus, a data sharing scheme using CLDL blocks, and signal selection process based on MVS, may ensure that all three lanes prepare critical ADB transmission data that are bit-for-bit identical.

In an embodiment, the REU 103 may include one or more voter components to facilitate the data coherency processes described above. The voter components may be programmed to perform digital coherency techniques that enables exact values to be produced in all lanes.

A synchronization algorithm may be implemented by the SYNC blocks among the lanes 110, 130, 150 of the REU 103 to achieve lane synchronization in order to ensure that all three lanes 110, 130, 150 generate bit-for-bit identical outputs. In an example, each lane may implement a processing frame, where each processing frame may include a series of tasks that are performed in a consistent sequence. Each lane may generate a synchronization request via a hardware discrete output at the end of the processing frame. At each lane, upon a power-up or a recovery from a reset and initialization, the lane may issue a synchronization request to the other two lanes. A lane that received or detected two active synchronization requests may open a synchronization window. A width of the synchronization window may be based on a worst case timing tolerance associated with respective lane clocks and synchronization discrete timing. During the synchronization window, the synchronization request from the third processing lane is anticipated to be received by the two lanes that already issued synchronization requests. If the third synchronization request is received, then all three lanes are synchronized. If during the synchronization window the third sync request is not received then the lane that failed to issue the synchronization request may be reset by the other two lanes. While the third lane is resetting, the two lanes that achieved synchronization may provide full REU functionality.

For example, at the end of a processing frame of the lane 110, the lane 110 may issue a first synchronization request 120*a* to lanes 130, 150 through SYNC block 117, where lanes 130, 150 may receive synchronization request 120*a* through SYNC blocks 137, 157, respectively. The lane 110 may further receive a second synchronization request 120*b* from the lane 130 through SYNC block 117. Upon receiving the second synchronization request 120*b* from the lane 130, the lane 110 and the lane 130 may be synchronized and may perform respective series of tasks in respective processing frames synchronously. Further, in response to issuance of the local synchronization request (the first synchronization request 120*a*), and in response to the receipt of the second synchronization request 120*b* from the lane 130, the lane 110 may define a synchronization window. During the synchronization window, the lane 110 may anticipate receipt of a third synchronization request 120*c* from the lane 150. If the third synchronization request 120*c* from the lane 150 is received at both the lanes 110, 130, then all three lanes 110, 130, 150 are synchronized, and all three lanes 110, 130, 150 may perform respective series of tasks in respective processing frames synchronously. If during the synchronization window, the third synchronization request 120c is not received at the lane 110, then the lane 150 may be reset by the lane 110. While the lane 150 is resetting, the two lanes 110, 130 that achieved synchronization may provide full REU functionality.

The lane synchronization algorithm, described above, may solve a problem where each lane may be executing respective tasks at the same time. The data coherency algorithm, described above, may further enable the REU 103 to achieve bit-for-bit transmission by ensuring that the three lanes 110, 130, 150 use the same input data to generate output data 104 for the actuator 105.

In the example shown in FIG. 1, the two lanes 130, 150 may be configured to generate output data that may be transmitted to the actuator control electronics (ACE), such that the ACE may monitor and/or process the output data, and feed the output data into the control laws to generate a valid actuator commands in a close loop system. For example, the actuator 105 may received either output data 104b or output date 104c from lane 130 or lane 150. The lane 110 may generate output data for the purpose of assuring a correctness of the output data being transmitted to the actuator 105. As such, even though the lane 110 generates output data 104a, the output data 104a may not be an output being transmitted to the actuator 105.

Selection and transmission of one of output data 104a or 104b may be based on utilization of a voter 124 and a multiplexer ("MUX") 125. The voter 124 may be a three input voter such that when two out of the three inputs into the voter 124 are identical, the voter 124 may output a selection signal ("SEL") to the MUX 125. The lanes 130, 150, may transmit respective output data 104b, 104c, to the MUX 125 and the voter 124. The lane 110 may transmit output data 104a to the voter 124 but not to the MUX 125. As will be described in more detail below, the MUX 125 may receive the SEL signal from the voter 124, where the SEL signal may indicate a selection of one of output data 104b, 104c received at the MUX 125. In response to receipt of the SEL signal, the MUX may transmit one of output data 104b, 104c, to the actuator 105 through a ADB (not shown) and via an ACE.

In an example, if voter 124 receives output data 104a, 104b, 104c that are identical, the voter 124 may output the SEL signal to the MUX 125. In examples where all three outputs are identical, a selection of whether to transmit the output data 104b, 104c to the actuator 105 may be based on a location of the REU 103 among the aircraft. In another example, if voter 124 receives output data 104a, 104b that are identical but output data 104c is different from output data 104a, 104b, the voter 124 may determine that there is a fault (one-lane failure) but may still output the SEL signal to the MUX 125 to instruct the MUX 125 to select output data 104b. Similarly, if voter 124 receives output data 104a, 104c that are identical but output data 104b is different from output data 104a, 104c, the voter 124 may determine that there is a fault (one-lane failure) but may still output the SEL signal to the MUX 125 to instruct the MUX 125 to select output data 104c. In another example, if voter 124 receives output data 104a, 104b, 104c, that are different from each other, the voter 124 may determine that there is a fault (two-lane failure) and may not output the SEL signal to the MUX 125.

Figure 2:
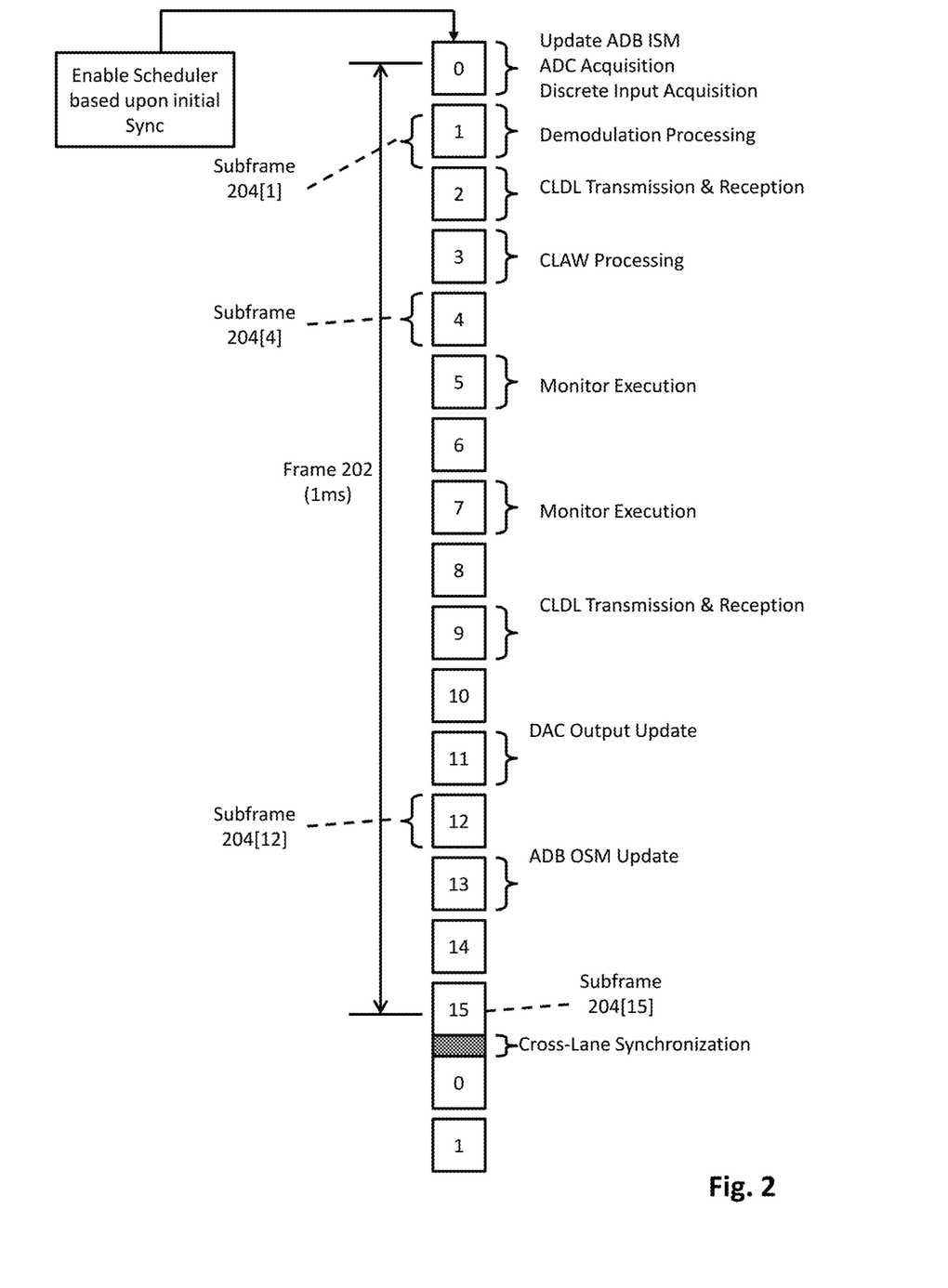
FIG. 2 an example processing frame relating to the three lane bit-for-bit remote electronic unit described in FIG. 1 in one embodiment.

FIG. 2 illustrates an example processing frame relating to the three lane bit-for-bit remote electronic unit described in FIG. 1, arranged in accordance with at least some embodiments described herein. The below description of FIG. 2 may reference components of FIG. 1.

In an example shown in FIG. 2, a processing frame 202 of a lane (e.g., lane 110, 130, or 150) may be scheduled, such as by a scheduler (not shown) of the REU 103, to a duration of one millisecond (1 ms). A number of subframes among the processing frame 202 may be configurable, such as at compile-time, and depending on a desired implementation. The processing frame 202 shown in FIG. 2 includes sixteen (16) subframes 204 (labeled as subframes [0] to [15]), such that each subframe 204 may be of a duration of 62.5 microseconds (µs). The subframes 204 may be executed sequentially and each in their entirety, regardless of how quickly a function being executed in the processing frame 202 actually completes. In some examples, more than one function may be executed during a given subframe. The final subframe 204 [15] may be assigned, or dedicated, to implement cross lane synchronization for lanes 110, 130, 150. Synchronization among the lanes 110, 130, 150 may result in immediate "re-starting" (or "e-synchronizing") of the scheduler to subframe [15], which may include a same effect as an initial post-POR Sync.

In the example processing frame shown in FIG. 2, each lane may perform a series of task within the processing frame 202, and may perform different tasks at different subframes 204. In some examples, particular tasks may span more than one subframes. In some examples, particular subframes may be idled such that no task may be performed at the idled subframe. In some examples, the lanes 110, 130, 150 may be configured to perform tasks that may not be shown or described in FIG. 2. The processing frame 202 may be initialized by enabling a scheduler of the REU 103.

At subframe 204 [0], the lane may perform the tasks of updating an ADB input signal management (ISM), acquiring digitized data from a analog-to-digital converter (ADC), and acquiring discrete inputs. In an example, ISM may be a firmware entity that facilitates receipt of data at the respective lane from various hardware interfaces (e.g., such as actuator data bus), analog-to-digital converter inputs, discrete inputs, etc.) and may make the received data available to the various firmware processes that may use the received data (e.g., demodulation, CLAW, Monitors, etc).

At subframe 204 [1], the lane may perform a demodulation process on received inputs, such as input data 102. At subframe 204 [2], the lane may perform CLDL transmission and reception, such as sharing a copy of the input data 102, and receiving copies of the input data 102 from the other two lanes. At subframe 204 [3], the lane may process control laws (CLAW) variables, such as integrators and derivatives, in order to generate output data 104 based on input data 102.

At subframes 204 [5] to 204 [7], the lane may continue to monitor execution of the series tasks, such as generation of output data 104, being performed by the lane. At subframe 204 [9], the lane may perform further CLDL transmission and reception tasks. At subframe 204 [11], the lane may update outputs of digital-to-analog converter (DAC), such as by sending the generated output data 104 to a DAC in order to convert output data 104 into a format suitable to be used by the actuator 105.

At subframe 204 [13], the lane may update the ADB output signal management (OSM). The OSM may be a firmware process that collects the data to be outputted by the respective lane, and may make the collected data available for use by other firmware processes (e.g., ADB output data, CLAW output data, etc). The ADB OSM Update subframe 204 [13] may be specifically related to the update of the ADB output data for the current frame.

At subframe 204 [15], the final subframe, the lane may perform the cross lane synchronization process by generating, a first synchronization request, and issuing the first synchronization request to the two adjacent lanes. Subsequently, the processing frame 202 may be restarted at a new subframe [0].

Figure 3:
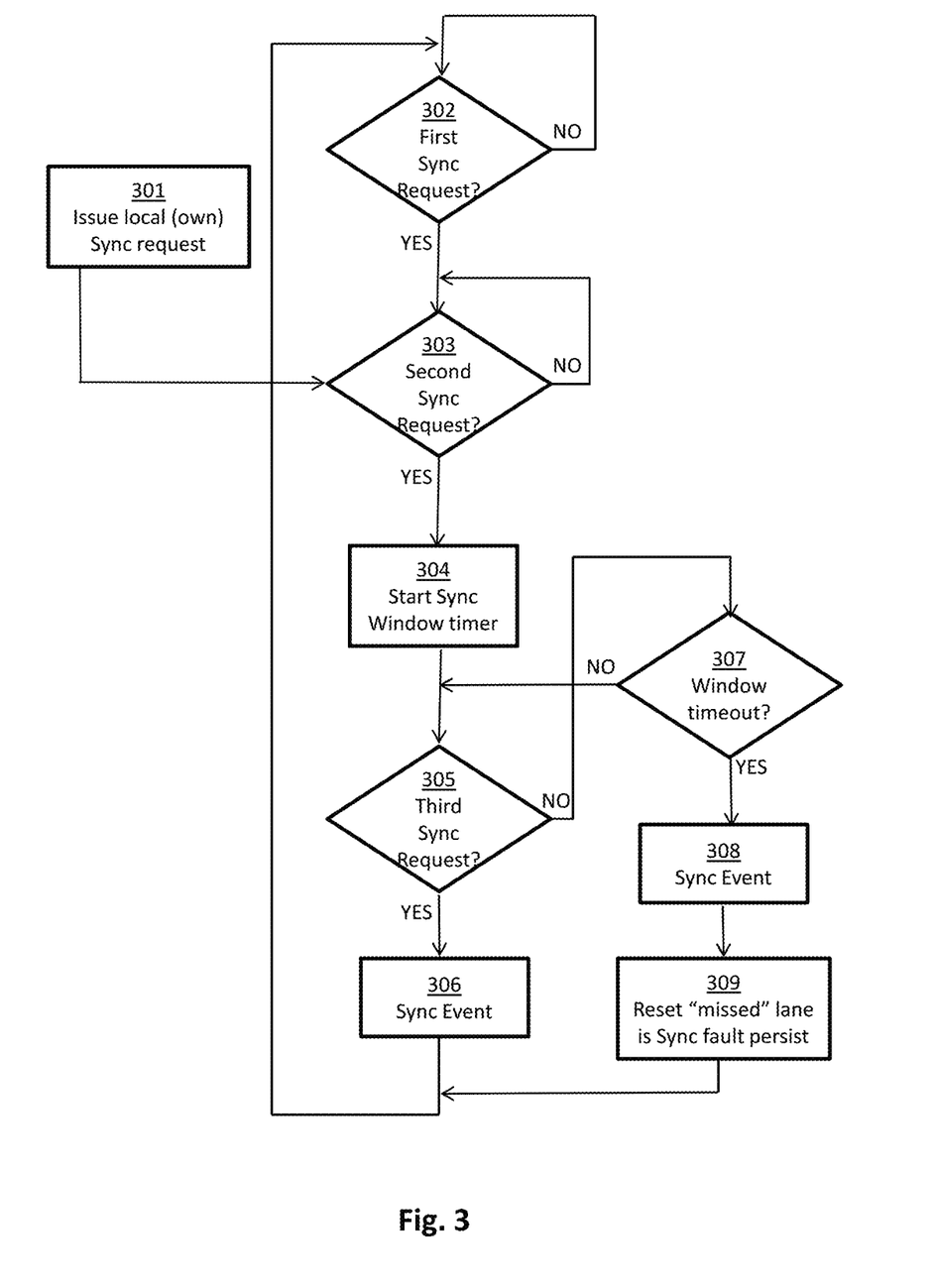
FIG. 3 illustrates a flow diagram of a process relating to a three lane bit-for-bit remote electronic unit in one embodiment.

FIG. 3 illustrates a flow diagram of a process relating to a three lane bit-for-bit remote electronic unit, arranged in accordance with at least some embodiments described herein. The below description of FIG. 3 may reference components of FIG. 1 and FIG. 2.

In an example, synchronization requests issued by each lane 110, 130, 150 may be active low assertions. As described above, lane 110, 130, 150 may generate, a respective synchronization request at the end, or at a last subframe (e.g., subframe 204 [15] in FIG. 2), of its respective processing frame. In the flow chart shown in FIG. 3, the synchronization process may begin when a first lane among the lanes 110, 130, 150, issues a local synchronization request at block 301.

Upon issuing the local synchronization request, at block 303, the first lane that issued the local synchronization request may await for a second synchronization request, with the issue local synchronization being a first synchronization request (that is already issued, or received locally). The second synchronization request may be received from a second lane or a third lane among the lanes 110, 130, 150. The synchronization process may proceed to block 304 upon a receipt of the second synchronization request from the second lane.

At block 304, the first lane may start a synchronization window timer in response to receipt of two synchronization requests. The first lane may expect the third synchronization from the third lane within the synchronization window timer.

At block 305, if the first lane may receive the third synchronization request from the third lane, then a synchronization event may occur at block 306 where all three lanes 110, 130, 150 are synchronized. If the first lane does not receive the third synchronization request after a certain amount of time, at block 307, the first lane may determine if the synchronization window has timed out. If the synchronization window has not been timed out, the first lane may continue to wait for the third synchronization request from the third lane.

If the synchronization window has timed out, the synchronization process may continue to block 308, where a synchronization event may occur for the first lane and the second lane (the two lanes that has issued the first and second synchronization requests). As such, even though the synchronization window has timed out and the third synchronization request is not received, the REU 103 may continue to operate as long as synchronization between the first lane and the second lane is maintained. Also, a synchronization monitor of the first lane or the second lane may detect a fault where the third synchronization request was not received at the first lane. The synchronization monitor may determine that if the fault persists for more than a particular amount of time (e.g., 200 milliseconds), then the third lane needs to be reset. At block 309, the synchronization monitor may trip and the lane(s) that detected the fault may reset the failed lane (the third lane) in an attempt to restore normal operation in the failed lane.

The synchronization process may restart at block 302 after block 306 or block 309, where at block 302, the first lane may wait for a first synchronization request (or its own local synchronization request).

In some examples, a fault may be caused by a phenomenon of single event upset (SEU) that may drive any one of lanes 110, 130, 150 to miscompute output data for a given REU processing frame, which may cause a miscompute on the ADB Transmit. SEUs are usually self-healing as the fault may mitigate itself and the miscompute may eventually disappear. However, if the fault is a hardware failure, such as a single event latch up (SEL), then the fault may continue to persist and while the failure is persisting, downstream transmission monitor may continue to block the data being output by the REU 103, such as by invalidating the data leaving the REU 103.

Figure 4:
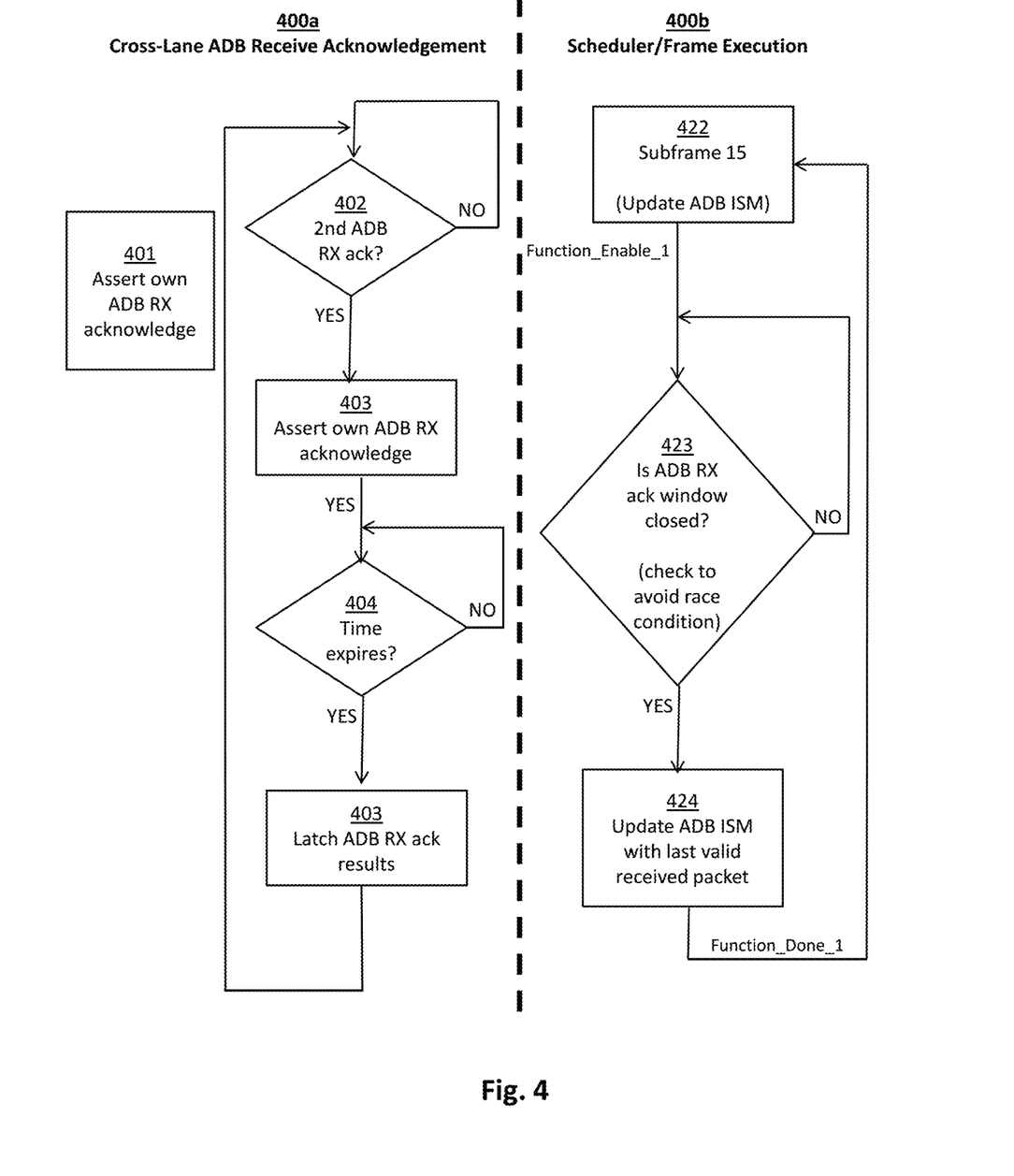
FIG. 4 illustrates a flow diagram of a process relating to a three lane bit-for-bit remote electronic unit in one embodiment.

FIG. 4 illustrates a flow diagram of a process relating to a three lane bit-for-bit remote electronic unit, arranged in accordance with at least some embodiments described herein. The below description of FIG. 4 may reference components of FIG. 1 and FIG. 2.

ADB data coherency may be ensured using a scheme similar to lane synchronization described above. In an example, implementation of cross-lane ADB reception acknowledgement may facilitate determination of a status of the most-recently written ABD data from the ACE to the REU 103 across lanes 110, 130, 150. In an example, the ADB may be a single ADB physical bus that may ensure minimal skew across lanes 110, 130, 105, for a given message reception.

An example flowchart relating to a process 400a is shown in FIG. 4, where the process 400a relates to a cross-lane ADB receive acknowledgement process. At block 401, a first lane may generate, an ADB receipt acknowledge signal via a hardware discrete output at the completion of receiving an ADB data packet. For example, the ADB Tx blocks 115, 135, 155, of lanes 110, 130 150 may each be configured to issue ADB receipt acknowledgement signal in response to receiving an ADB data packet, and the ADB Rx blocks 114, 134, 154, of lanes 110, 130 150 may each be configured to receive the ADB receipt acknowledgement signals. At blocks 402, 403, when a second lane also asserts its ADB receipt acknowledge signal, the lanes open an ADB receipt acknowledgement window in response to detection of two active ADB receipt acknowledge signals. The ADB receipt acknowledgement window width may be based on a worst case timing tolerance associated with lane clocks and ADB receipt processing timing.

During the ADB receipt acknowledgement window, the ADB receipt acknowledgement signal from the third processing lane is expected to be received by the two lanes that have already acknowledged completion of ADB receipt. If the ADB receipt acknowledgement is received from the third lane, then all lanes move forward using the latest ADB data, which is guaranteed to be identical in all three lanes. If, due to a fault condition, the ADB receipt acknowledgement is not received from the third lane within the ADB receipt acknowledgement window, then the other two lanes move on using the most recent ADB data. The third lane under the fault condition will use ADB data that is the previous valid received data. The third lane may recover from the fault on its own or the fault may persist. In either case, downstream monitoring in the REU may detect and block any subsequent faults of the third lane from propagating to REU outputs.

At block 404, the first lane may detect whether a duration of the window timer has expired. If the window timer has yet to expire, the process returns to block 403, where the first lane may continue to wait for the third ADB receipt acknowledgement signal. If the third ADB receipt acknowledgement is received, the first lane may terminate the window timer to make the window timer immediately expired, even if the window timeout period has not been achieved. In an example, the criteria for "Time expires" to be true in block 404 may be either 1) all 3 lanes have acknowledged receipt of ADB data, or 2) the window timer has expired. If the window timer has expired, the process continues to block 405, where the cross-lane results (exchanged ADB data among the lanes) may be captured and passed on to subsequent monitoring/fault management functions. The process of flowchart 400*a* may then return to block 402 to wait for a subsequent second ABD Rx acknowledgement signal from an adjacent lane.

An example flowchart relating to a process 400*b* is shown in FIG. 4, where the process 400*b* may be associated with a scheduler/frame execution of each lane among the lanes 110, 130, 150. A block 422, the lane processing the scheduler/frame execution may update an input signal management (ISM) with ADB data, where the update may be performed synchronously across lanes 110, 130, 150. The update of the ISM with the ADB data may be synchronized across the three lanes because the lanes are already synchronized, and the ISM update may not be performed prior to the lanes being synchronized. In an example, the actual data that passed through the ISM may be determined based upon a last valid packet (e.g., ADB data packet that was not faulty). For example, each lane may examine cross-lane results (e.g., the results latched by process 400*a*) to determine an appropriate action, for those lanes that failed to acknowledge packet receipt.

At block 423, the lane may check whether the ADB receipt acknowledgement window is closed (or expired), in order to avoid an occurrence of a race condition. If the ADB receipt acknowledgement window is not closed, the lane may continue to wait for receipt of ABD receipt acknowledgement signals from other lanes. If the ADB receipt acknowledgement window is closed, the lane may move on to block 424, where the lane may update the ISM with the last valid received packet. The lane may perform this update function of ISM at each instance of processing frame.

Figure 5:
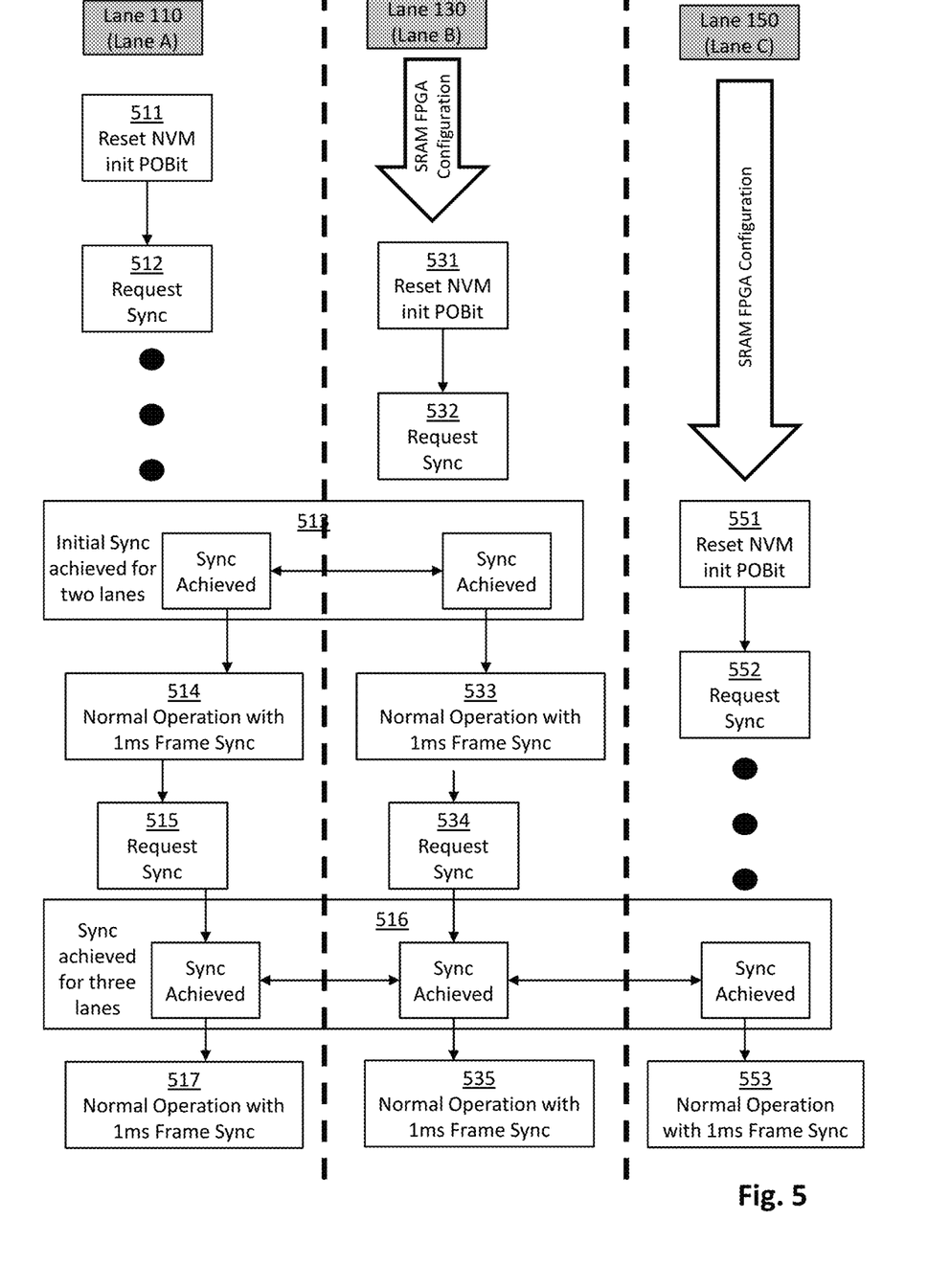
FIG. 5 illustrates a flow diagram of a process relating to a three lane bit-for-bit remote electronic unit in one embodiment.

FIG. 5 illustrates a flow diagram of a process relating to a three lane bit-for-bit remote electronic unit, arranged in accordance with at least some embodiments described herein. The below description of FIG. 5 may reference components of FIG. 1 and FIG. 2.

The example flowchart shown in FIG. 5 relates to a synchronization algorithm used to achieve initial cross-lane synchronization (as part of start-up) of lanes 110, 130, 150 (labeled as lane A, lane B, lane C) of the REU 103. Lanes A, B, C may be operating asynchronously, and achieving synchronization across lanes A, B, C may cause lanes A, B, C to each generate an bit-for-bit identical output.

At block 511, the first lane, lane A, may be initialized. At block 512, lane A may issue a first synchronization request to the second lane (lane B) and the third lane (lane C). Lane A may wait for a receipt of a synchronization request from either lane B or lane C. In some examples, any lane among lanes A, B, C may issue the first synchronization request.

Block 531 may occur later than block 511, where the second lane, lane B, may be initialized. Since the initialization of lane B occurs later than an initialization of lane A, lane B may issue the second synchronization request to lane A and lane C at block 532, which occurs at a later time than block 512.

Lane A may receive the second synchronization request, and at block 513, synchronization is achieved between lane A and lane B. As shown, no synchronization event may be realized until at least two lanes agree to sync (e.g., having two synchronization request including its own local synchronization request). As a result, at blocks 514, 533, lane A and lane B may perform respective series of tasks in respective processing frames synchronously. In an example, lane A and lane B may synchronously generate a bit-for-bit identical output based on synchronization. At blocks 515, 534, synchronized lane A and lane B may issue a next synchronization request, and may each await a third synchronization request from lane C.

Block 551 may occur later than blocks 511, 531, where the third lane, lane C, may be initialized. Since the initialization of lane C occurs later than initializations of lane A and lane B, lane C may issue the third synchronization request to lane A and lane B at block 552. In the example, block 522 may occur after the synchronization of lane A and lane B at block 513. If block 522 occurred prior to block 513, then synchronization may be achieved for all three lanes at block 513. Since block 522 occurs after block 513, the lane C may have to wait for a next synchronization window to achieve synchronization with lane A and lane B. In some examples, the last lane to come on-line issues its synchronization request at the end of initialization, and naturally achieves synchronization when the two adjacent lanes issue synchronization requests.

Upon issuing new synchronization requests at blocks 515, 534, lane A and lane B may receive the third synchronization request from lane C issued at block 552. As such, all three lanes A, B, C, may achieve synchronization at block 516. As a result, at blocks 517, 535, 553, lanes A, B, C may perform respective series of tasks in respective processing frames synchronously. In an example, the cross-lane synchronization of the process shown in FIG. 5 may be maintained by executing the synchronization algorithm once per processing frame, as the mechanism by which the processing frame is re-started.

A system and architecture associated with the REU described in the present disclosure may provide an improvement in REU designs. In some examples, REUs have been implemented with architectures that rely on the lanes of the REU to diverge slightly and use lane tracking algorithms to keep the lanes closely aligned. However, these architectures are unable to generate bit-for-bit identical outputs, or zero mismatch between outputs from the lanes. Further, the synchronization process in accordance with the present disclosure may achieve synchronization across all three lanes within a feasible amount of time, such as less than one microsecond (1 µs). Further, preliminary analysis shows a maximum lane-to-lane clock drift of 200 nanoseconds (ns) may be achieved over a 1 ms processing frame time. Further, the data coherency process in accordance with the present disclosure provides data coherency for a serial bus, which improves REU designs by generating and providing bit-for-bit tracking for all fixed point values that are being transmitted out to a digital serial bus (from the REU). As such, perfect tracking (zero error) among the outputs generated by all lanes may be achieved.

Figure 6:
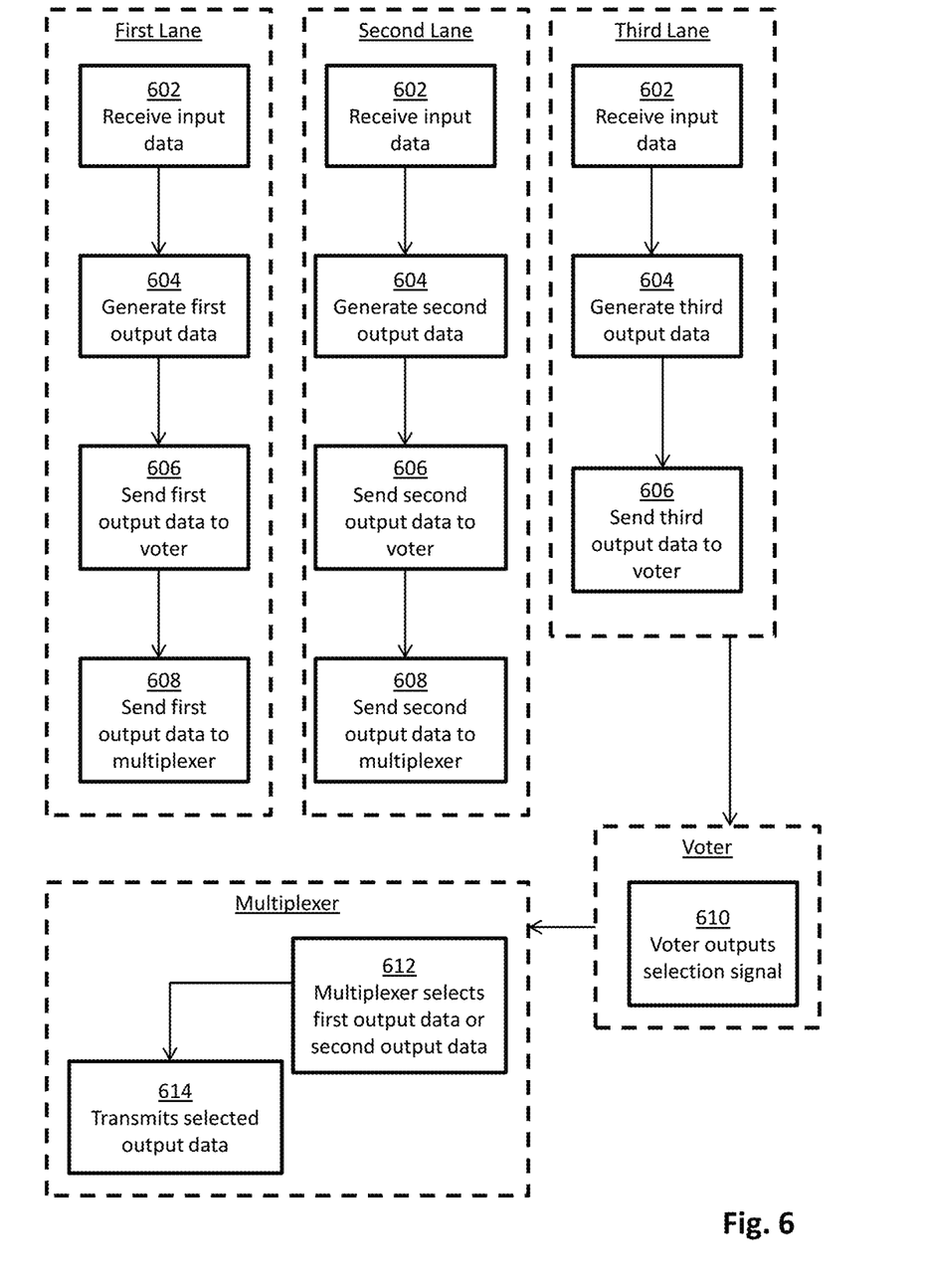
FIG. 6 illustrates a flow diagram of a process relating to a three lane bit-for-bit remote electronic unit in one embodiment.

FIG. 6 illustrates a flow diagram of a process relating to a three lane bit-for-bit remote electronic unit, arranged in accordance with at least some embodiments presented herein. The process in FIG. 6 may be implemented using, for example, computer system 100 discussed above. An example process may include one or more operations, actions, or functions as illustrated by one or more of blocks 602, 604, 606, 608, 610, 612, and/or 614. Although illustrated as discrete blocks, various blocks may be divided into additional blocks, combined into fewer blocks, eliminated, or performed in parallel, depending on the desired implementation.

Processing may begin at blocks 602, which may be performed by a first lane, a second lane, and a third lane of a remote electronic unit. At blocks 602, the first lane, the second lane, and the third lane may each receive input data associated with a command to control an actuator.

Processing may continue from blocks 602 to blocks 604. At blocks 604, the first lane, the second lane, and the third lane may each generate first output data, second output data, and third output data, respectively, based on the input data.

Processing may continue from blocks 604 to blocks 606. At blocks 606, the first lane, second lane, and third lane may send the first output data, the second output data, and the third output data to a voter of the remote electronic unit.

Processing may continue from blocks 606 to blocks 608. At blocks 608, the first lane and the second lane may send the first output data and the second output data to a multiplexer of the remote electronic unit.

Processing may continue from blocks 608 to block 610. At block 610, the voter may output a selection signal to the multiplexer in response to at least two out of the first, second, and third output data being identical.

Processing may continue from block 610 to block 612. At block 612, the multiplexer may select one of the first output data or the second output data based on the selection signal received from the voter.

Processing may continue from block 612 to block 614. At block 614, the multiplexer may transmit the selected output data to an actuator control electronics unit that is configured to convert the selected output data into an analog servo command for the actuator.

In some examples, the input data received by the first lane may be a first copy of the input data. The first lane may send the first copy of the input data to the second lane and to the third lane. The second lane may receive a second copy of the input data. The second lane may send the second copy of the input data to the first lane and to the third lane. The third lane may receive a third copy of the input data. The third lane may send the third copy of the input data to the first lane and to the second lane. Each of the first, second, and third lane may identify a particular copy of the input data among the first, second, and third copies of the input data. The generation of the first, second, and third output data may be based on the identified copy of the input data. In some examples, the first lane may identify the particular copy of the input data by performing a mid-value selection on the first, the second, and the third copy of the input data. In some examples, the first lane may determine whether one of the first, second, and third copies of input data is out of tolerance. If one of the first, second, and third copies of the input data is out of tolerance, the first lane may reset the lane that provided the out of tolerance copy of the input data.

In some examples, the first lane may define a synchronization window and may anticipate a synchronization request from the third lane within the synchronization window. In response to a failure to receive the synchronization request from the third lane within the synchronization window, the first lane may detect an occurrence of a fault at the third lane. The first lane may determine whether the fault persists for more than an amount of time. In response to the fault persisting for more than the amount of time, the first lane may reset the third lane.

In some examples, the first output data, the second output data, and the third output data may be identical at the bit level. In some examples, the first lane, the second lane, and the third lane may be configured to operate asynchronously prior to the receipt of the second synchronization request by the first lane.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A remote electronic unit comprising:
a first lane configured to be in communication with a voter and a multiplexer, the first lane configured to:
receive input data associated with a command to control an actuator;
generate first output data based on the input data;
send the first output data to the voter;
send the first output data to the multiplexer;
a second lane configured to be in communication with the first lane, the voter, and the multiplexer, the second lane configured to:
receive the input data;
generate second output data based on the input data;
send the second output data to the voter;
send the second output data to the multiplexer;
a third lane configured to be in communication with the first lane, the second lane, the voter, and the multiplexer, the third lane configured to:
receive the input data;
generate third output data based on the input data;
send the third output data to the voter;
wherein:
the voter is configured to output a selection signal to the multiplexer in response to at least two out of the first, second, and third output data being identical;
the multiplexer is configured to:
select one of the first output data and the second output data based on the selection signal; and
transmit the selected output data to an actuator control electronics unit that is configured to convert the selected output data into an analog servo command for the actuator.

2. The remote electronic unit of claim 1, wherein
the input data received by the first lane is a first copy of the input data;
the first lane is further configured to send the first copy of the input data to the second lane and to the third lane;
the second lane is further configured to:
receive a second copy of the input data;
send the second copy of the input data to the first lane and to the third lane;
the third lane is further configured to:
receive a third copy of the input data;
send the third copy of the input data to the first lane and to the second lane;
wherein each of the first, second, and third lane is further configured to:
identify a particular copy of the input data among the first, second, and third copies of the input data, and generation of the first, second, and third output data is based on the identified copy of the input data.

3. The remote electronic unit of claim 2, wherein the identification of the particular copy of the input data includes performing a mid-value selection on the first, the second, and the third copy of the input data.

4. The remote electronic unit of claim 2, wherein the first lane is further configured to:
determine whether one of the first, second, and third copies of input data is out of tolerance; and
in response to the determination that one of the first, second, and third copies of the input data is out of tolerance, reset the lane that provided the out of tolerance copy of the input data.

5. The remote electronic unit of claim 1, wherein the first lane, the second lane, and the third lane are configured to operate asynchronously prior to receipt of a second synchronization request by the first lane.

6. The remote electronic unit of claim 1, wherein:
the first lane is configured to:
generate a first synchronization request;
send the first synchronization request to the second lane and to the third lane;
the second lane is configured to:
receive the first synchronization request from the first lane;
generate a second synchronization request;
send the second synchronization request to the first lane;
the first lane is further configured to receive the second synchronization request from the second lane, and the first lane is synchronized with the second lane in response to receipt of the second synchronization request; and
in response to the synchronization between the first lane and the second lane, the first lane is configured to perform a first series of tasks in a first processing frame, the second lane is configured to perform a second series of tasks in a second processing frame, and the first series and the second series of tasks are performed in synchronization.

7. The remote electronic unit of claim 1, wherein in response to a failure to receive a synchronization request from the third lane within a time window, the first lane is further configured to:
detect an occurrence of a fault at the third lane;
determine whether the fault persists for more than an amount of time; and
in response to the fault persisting for more than the amount of time, reset the third lane.

8. The remote electronic unit of claim 1, wherein the first output data, the second output data, and the third output data are identical at the bit level.

9. A method for generating output data to control an actuator, the method comprising, by a remote electronic unit:
receiving, at a first lane, a second lane, and a third lane of the remote electronic unit, input data associated with a command to control an actuator;
generating, by the first lane, first output data based on the input data;
sending, by the first lane, the first output data to a voter;
sending, by the first lane, the first output data to a multiplexer;
generating, by the second lane, second output data based on the input data;
sending, by the second lane, the second output data to the voter;
sending, by the second lane, the second output data to the multiplexer;
generating, by the third lane, third output data based on the input data;
sending, by the third lane, the third output data to the voter;
outputting, by the voter, a selection signal to the multiplexer in response to at least two out of the first, second, and third output data being identical;
selecting, by the multiplexer, one of the first output data and the second output data based on the selection signal; and
transmitting, by the multiplexer, the selected output data to an actuator control electronics unit that is configured to convert the selected output data into an analog servo command for the actuator.

10. The method of claim 9, wherein the input data received by the first lane is a first copy of the input data, and the method further comprising:
sending, by the first lane, the first copy of the input data to the second lane and to the third lane;
receiving, by the second lane, a second copy of the input data;
sending, by the second lane, the second copy of the input data to the first lane and to the third lane;
receiving, by the third lane, a third copy of the input data;
sending, by the third lane, the third copy of the input data to the first lane and to the second lane;
identifying, by each of the first, second, and third lane, a particular copy of the input data among the first, second, and third copies of the input data, wherein generation of the first, second, and third output data is based on the identified copy of the input data.

11. The method of claim 10, wherein the identifying the particular copy of the input data includes performing a mid-value selection on the first, the second, and the third copy of the input data.

12. The method of claim 10, further comprising:
determining, by the first lane, whether one of the first, second, and third copies of input data is out of tolerance; and
in response to determining that one of the first, second, and third copies of the input data is out of tolerance, resetting, by the first lane, the lane that provided the out of tolerance copy of the input data.

13. The method of claim 9, further comprising in response to a failure to receive a synchronization request from the third lane within a time window:
detecting, by the first lane, an occurrence of a fault at the third lane;
determining, by the first lane, whether the fault persists for more than an amount of time; and
in response to the fault persisting for more than the amount of time, resetting, by the first lane, the third lane.

14. The method of claim 9, wherein the first output data, the second output data, and the third output data are identical at the bit level.

15. A system effective to generate an output to control an actuator, the system comprising:
an actuator;
a control mechanism configured to generate input data associated with a command to control the actuator;
an actuator control electronics unit that is configured to convert the command into an analog servo command for the actuator;

a remote electronic unit configured to be in communication with the control mechanism and the actuator, the remote electronic unit comprising:
a first lane;
a second lane configured to be in communication with the first lane;
a third lane configured to be in communication with the first lane and the second lane;
a voter configured to be in communication with the first lane, the second lane, and the third lane;
a multiplexer configured to be in communication with the first lane and the second lane;
the first lane is configured to:
  receive the input data;
  generate first output data based on the input data;
  send the first output data to the voter;
  send the first output data to the multiplexer;
the second lane is configured to:
  receive the input data;
  generate second output data based on the input data;
  send the second output data to the voter;
  send the second output data to the multiplexer;
the third lane is configured to:
  receive the input data;
  generate third output data based on the input data;
  send the third output data to the voter;
the voter is configured to output a selection signal to the multiplexer in response to at least two out of the first, second, and third output data being identical;
the multiplexer is configured to:
  select one of the first output data and the second output data based on the selection signal; and
  transmit the selected output data to the actuator control electronics unit;
actuator control electronics unit is configured to convert the selected output data into the analog servo command for the actuator.

16. The system of claim 15, wherein
the input data received by the first lane is a first copy of the input data;
the first lane is further configured to send the first copy of the input data to the second lane and to the third lane;
the second lane is further configured to:
  receive a second copy of the input data;
  send the second copy of the input data to the first lane and to the third lane;
the third lane is further configured to:
  receive a third copy of the input data;
  send the third copy of the input data to the first lane and to the second lane;
wherein each of the first, second, and third lane is further configured to:
identify a particular copy of the input data among the first, second, and third copies of the input data, and generation of the first, second, and third output data is based on the identified copy of the input data.

17. The system of claim 16, wherein the identification of the particular copy of the input data includes performing a mid-value selection on the first, the second, and the third copy of the input data.

18. The system of claim 16, wherein the first lane is further configured to:
determine whether one of the first, second, and third copies of input data is out of tolerance; and
in response to the determination that one of the first, second, and third copies of the input data is out of tolerance, reset the lane that provided the out of tolerance copy of the input data.

19. The system of claim 15, wherein in response to a failure to receive a synchronization request from the third lane within a time window:
detect an occurrence of a fault at the third lane;
determine whether the fault persists for more than an amount of time; and
in response to the fault persisting for more than the amount of time, reset the third lane.

20. The system of claim 15, wherein the first output data, the second output data, and the third output data are identical at the bit level.

* * * * *